United States Patent
Yoshimoto

(10) Patent No.: US 12,101,384 B2
(45) Date of Patent: Sep. 24, 2024

(54) TERMINAL DEVICE AND CONTROL METHOD THEREOF AND SYSTEM

(71) Applicant: Canon Kabushiki Kaisha, Tokyo (JP)

(72) Inventor: Yuhei Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/295,325

(22) Filed: Apr. 4, 2023

(65) Prior Publication Data

US 2023/0353654 A1 Nov. 2, 2023

(30) Foreign Application Priority Data

Apr. 28, 2022 (JP) ................................. 2022-074431

(51) Int. Cl.
*H04L 67/55* (2022.01)
*H04L 67/568* (2022.01)

(52) U.S. Cl.
CPC ............ *H04L 67/55* (2022.05); *H04L 67/568* (2022.05)

(58) Field of Classification Search
None
See application file for complete search history.

(56) References Cited

U.S. PATENT DOCUMENTS

| | | | | |
|---|---|---|---|---|
| 10,462,217 B2 * | 10/2019 | Song | ...................... | H04W 4/08 |
| 2016/0210578 A1 * | 7/2016 | Raleigh | .............. | G06Q 30/0284 |
| 2018/0097764 A1 * | 4/2018 | Lutsenko | .............. | H04L 51/224 |
| 2018/0103114 A1 * | 4/2018 | Shibuya | ................ | H04L 67/568 |
| 2019/0394111 A1 * | 12/2019 | Sasagawa | .......... | G06Q 30/0255 |
| 2020/0396266 A1 * | 12/2020 | Goel | ...................... | H04L 67/306 |
| 2022/0070010 A1 * | 3/2022 | Frolovichev | ........... | H04N 7/147 |
| 2023/0269285 A1 * | 8/2023 | Mills | ....................... | H04L 67/06 |
| | | | | 709/219 |

FOREIGN PATENT DOCUMENTS

| | | | | | |
|---|---|---|---|---|---|
| JP | 2014-006688 A | | 1/2014 | | |
| JP | 2019215829 A | * | 12/2019 | ........... | G06F 3/0482 |
| JP | 2020021130 A | * | 2/2020 | ......... | G06Q 30/0239 |
| JP | 6943829 B2 | * | 10/2021 | ........... | C07C 53/126 |
| WO | WO-2015053196 A1 | * | 4/2015 | ............. | H04L 67/26 |

* cited by examiner

*Primary Examiner* — Phyllis A Book
(74) *Attorney, Agent, or Firm* — Venable LLP

(57) ABSTRACT

In a push notification service, information desired to be surely delivered to a user is displayed on a terminal device. A control method of a terminal device includes: a reception step for receiving notification information; and an execution step for executing a first notification process being executed for providing a notification of a first content based on notification information received by the terminal device in a case where the notification information includes first information for the notification of the first content and second information for a notification of a second content, and executing a second notification process being executed for providing the notification of the second content based on the notification information after the first content is displayed by executing the first notification process.

17 Claims, 16 Drawing Sheets

FIG.5

| | NOTIFICATION INFORMATION | |
|---|---|---|
| NOTIFICATION TRANSMISSION DATE (510) | 2021/12/1 | |
| NOTIFICATION TRANSMISSION TARGET (520) | AAA Printer USER | |
| NOTIFICATION CONTENT | CONTENTS | Title: NOTIFICATION OF UPDATE, Message: DL OF THE LATEST VERSION IS HERE, Link: http://www.hogehoge.com/update (531a) |
| NOTIFICATION CONTENT | CONTENTS | Title: INTRODUCING PRINTING CONTENTS, Message: THE NEW CONTENTS ARE HERE, Link: http://www.hogehoge.com/content (531b) |

| NOTIFICATION INFORMATION 700 | | |
|---|---|---|
| NOTIFICATION TRANSMISSION DATE 710 | 2021/12/1 | |
| NOTIFICATION TRANSMISSION TARGET 720 | AAA Printer USER | |
| NOTIFICATION CONTENT 730 | IDENTIFIER | I_00A — 732a |
| | CONTENTS | Title: NOTIFICATION OF UPDATE, Message: DL OF THE LATEST VERSION IS HERE, Link: http://www.hogehoge.com/update — 731a |
| NOTIFICATION CONTENT | IDENTIFIER | - — 732b |
| | CONTENTS | Title: INTRODUCING PRINTING CONTENTS, Message: THE NEW CONTENTS ARE HERE, Link: http://www.hogehoge.com/content — 731b |

NOTIFICATION INFORMATION 1000

| NOTIFICATION TRANSMISSION DATE | | 2021/12/1 |
|---|---|---|
| NOTIFICATION TRANSMISSION TARGET | | AAA Printer USER |
| NOTIFICATION CONTENT | ADDITION PERIOD | 2021/12/1~2021/12/31 |
| | CONTENTS | Title: NOTIFICATION OF UPDATE, Message: DL OF THE LATEST VERSION IS HERE, Link: http://www.hogehoge.com/update |
| NOTIFICATION CONTENT | ADDITION PERIOD | - |
| | CONTENTS | Title: INTRODUCING PRINTING CONTENTS, Message: THE NEW CONTENTS ARE HERE, Link: http://www.hogehoge.com/content |

- 1010: NOTIFICATION TRANSMISSION DATE
- 1020: NOTIFICATION TRANSMISSION TARGET
- 1030: NOTIFICATION CONTENT
- 1031a, 1032a, 1031b, 1032b

| NOTIFICATION INFORMATION 1100 | | | |
|---|---|---|---|
| NOTIFICATION TRANSMISSION DATE 1110 | 2021/12/1 | | |
| NOTIFICATION TRANSMISSION TARGET 1120 | AAA Printer USER | | |
| NOTIFICATION CONTENT (1130) | DISPLAY CONDITION | USING THE OS VERSION 11 | 1132a |
| | CONTENTS | Title: NOTIFICATION OF UPDATE, Message: DL OF THE LATEST VERSION IS HERE, Link: http://www.hogehoge.com/update | 1131a |
| NOTIFICATION CONTENT | DISPLAY CONDITION | THE INK OF MODEL NUMBER 002 BEING MOUNTED | 1132b |
| | CONTENTS | Title: INTRODUCING PRINTING CONTENTS, Message: THE NEW CONTENTS ARE HERE, Link: http://www.hogehoge.com/content | 1131b |

| NOTIFICATION INFORMATION 1300 | |
|---|---|
| NOTIFICATION TRANSMISSION DATE 1310 | 2021/12/1 |
| NOTIFICATION TRANSMISSION TARGET 1320 | AAA Printer USER |
| NOTIFICATION CONTENT (1330) | CONTINUOUS-DISPLAY INTERVAL — 1332a: 15 MINUTES |
| | CONTENTS — 1331a: Title: NOTIFICATION OF UPDATE, Message: DL OF THE LATEST VERSION IS HERE, Link: http://www.hogehoge.com/update |
| NOTIFICATION CONTENT | CONTINUOUS-DISPLAY INTERVAL — 1332b: — |
| | CONTENTS — 1331b: Title: INTRODUCING PRINTING CONTENTS, Message: THE NEW CONTENTS ARE HERE, Link: http://www.hogehoge.com/content |

| NOTIFICATION INFORMATION 1500 | | | |
|---|---|---|---|
| NOTIFICATION TRANSMISSION DATE 1510 | 2021/12/15 | | |
| NOTIFICATION TRANSMISSION TARGET 1520 | AAA Printer USER | | |
| NOTIFICATION CONTENT | TARGET PERIOD | 2021/12/1~2021/12/31 | 1532a |
| | CONTENTS | Title: NOTIFICATION OF UPDATE, Message: DL OF THE LATEST VERSION IS HERE, Link: http://www.hogehoge.com/update | 1531a |
| NOTIFICATION CONTENT | TARGET PERIOD | — | 1532b |
| | CONTENTS | Title: INTRODUCING PRINTING CONTENTS, Message: THE NEW CONTENTS ARE HERE, Link: http://www.hogehoge.com/content | 1531b |

1530

TERMINAL DEVICE AND CONTROL METHOD THEREOF AND SYSTEM

BACKGROUND

Field of the Disclosure

The present disclosure relates to a terminal device and a control method thereof and system.

Description of the Related Art

Regarding an application that runs on a terminal device such as a smart phone or a personal computer, a function of notifying the terminal device of information related to the application from a server (hereinafter referred to as a push notification) is known. The information related to the application includes, for example, information of a service related to the application, information of a campaign, and information of a data update of the application. On the terminal device that has received the push notification, notification information related to the push notification is displayed. Further details of the push notification are displayed by a user's operation such as clicking or tapping on a display screen of the terminal device. In addition, there are such cases in which information is transferred to the application to execute internal processing without displaying the information on the terminal device.

On the other hand, a function that an application accesses a server by itself to obtain notification information and display the notification information on a terminal device at the timing where the application is launched (hereinafter referred to as a fetch notification) is known as well. With push notifications, information can be transmitted from servers regardless of the launching state of applications, and thus information can be transmitted in a timely manner unlike fetch notifications. Therefore, push notifications are suitable not only for transmitting information about regular campaigns or the like, but also for transmitting important information such as guidance for an update to the latest software version. For example, in Japanese Patent Laid-Open No. 2014-6688, there is described a technique of utilizing a push notification for transmitting important information as well and also for switching the display according to the importance levels of the information.

By utilizing a notification service provided between a notification management server and the operating system (hereinafter referred to as the OS) of a terminal device, it is possible to transmit information by push notifications. Notification information is sent from the notification management server, which provides notification information, to a push notification server together with information about a destination terminal device, so that the push notification server transfers the notification information to the predetermined terminal device. In a case where the destination terminal device of the push notification is offline, the notification information is temporarily cached on the push notification server side. However, the number of notifications that can be cached by the notification service is limited, and thus, in a case of receiving a notification exceeding the number of notifications that can be cached, an old notification is overwritten by the new one. In a case where a notification exceeding the number of notifications that can be cached is transmitted in a state where the terminal device is offline, the overwritten part of notifications cannot be received even after the terminal device transitions to the online state. Therefore, there may be a case in which an important notification desired to be surely delivered to the user is not received by the terminal device.

SUMMARY

An object of the present disclosure is to allow a terminal device to receive information desired to be surely delivered to a user even in a case where the number of notifications that can be cached in a push notification server is limited.

An embodiment of the present disclosure is a control method of a terminal device, and the control method includes: a reception step for receiving notification information; and an execution step for executing a first notification process being executed for providing a notification of a first content based on notification information received by the terminal device in a case where the notification information includes first information for the notification of the first content and second information for a notification of a second content, and executing a second notification process being executed for providing the notification of the second content based on the notification information after the first content is displayed by executing the first notification process.

Further features of the present disclosure will become apparent from the following description of exemplary embodiments with reference to the attached drawings.

BRIEF DESCRIPTION OF THE DRAWINGS

FIG. 5 is a diagram illustrating notification information in the first embodiment;

FIG. 7 is a diagram illustrating notification information in the second embodiment;

FIG. 10 is a diagram illustrating notification information in the third embodiment;

FIG. 11 is a diagram illustrating notification information in the fourth embodiment;

FIG. 13 is a diagram illustrating notification information in the fifth embodiment;

FIG. 15 is a diagram illustrating notification information in the sixth embodiment.

DESCRIPTION OF THE EMBODIMENTS

Hereinafter, detailed explanations are given of preferred embodiments of the present disclosure with reference to the accompanying drawings. Noted that the following embodiments are not intended to limit the disclosure described in the claims and that every combination of the characteristics explained in the present embodiments is not necessarily essential to the solution in the present disclosure.

Figure 1:
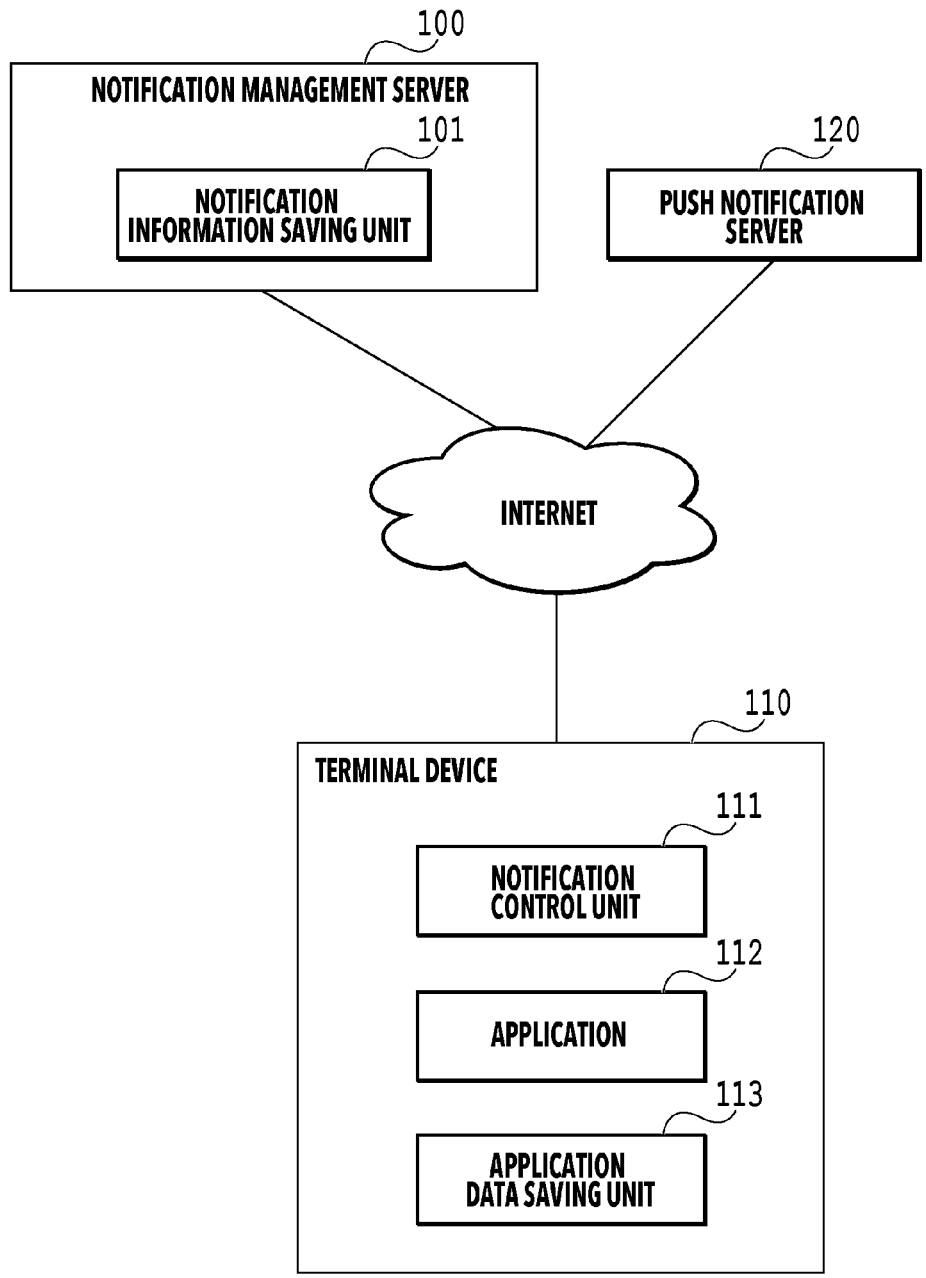
FIG. 1 is a diagram illustrating the configuration of a notification system according to the present embodiments.

In FIG. 1, the configuration of a notification system according to the present embodiments is illustrated. The notification system includes the notification management server 100, the terminal device 110, and the push notification server 120, which are interconnected via the Internet. The notification management server 100 includes the notification information saving unit 101 and is configured to create notification information to be transmitted to the terminal device 110 and transmit the notification information to destination terminal devices. Here, the notification information includes information necessary for transmitting a notification, such as the notification content, information of a destination terminal device that is the destination of a notification, and the date of transmission of a notification. Further, the notification content includes the contents to be displayed on a terminal device, secondary information necessary for displaying the contents, information to be transferred to the application 112, etc.

The push notification server 120 is a server that transfers notification information received from the notification management server 100 to the terminal device 110 as a push notification. The push notification server 120 has restriction on the number of notifications that can be cached per notification destination. In a case where the number of notifications that can be cached is one, the one latest notification information is held if the terminal device 110, which is the notification destination, is in the offline state.

The terminal device 110 is an information processing device such as a smartphone or a personal computer, which includes the notification control unit 111 of the OS, the application 112, and the application data saving unit 113. The notification control unit 111 of the OS is capable of displaying notification information received from the push notification server 120 or transferring the notification information to the application 112.

Figure 2:
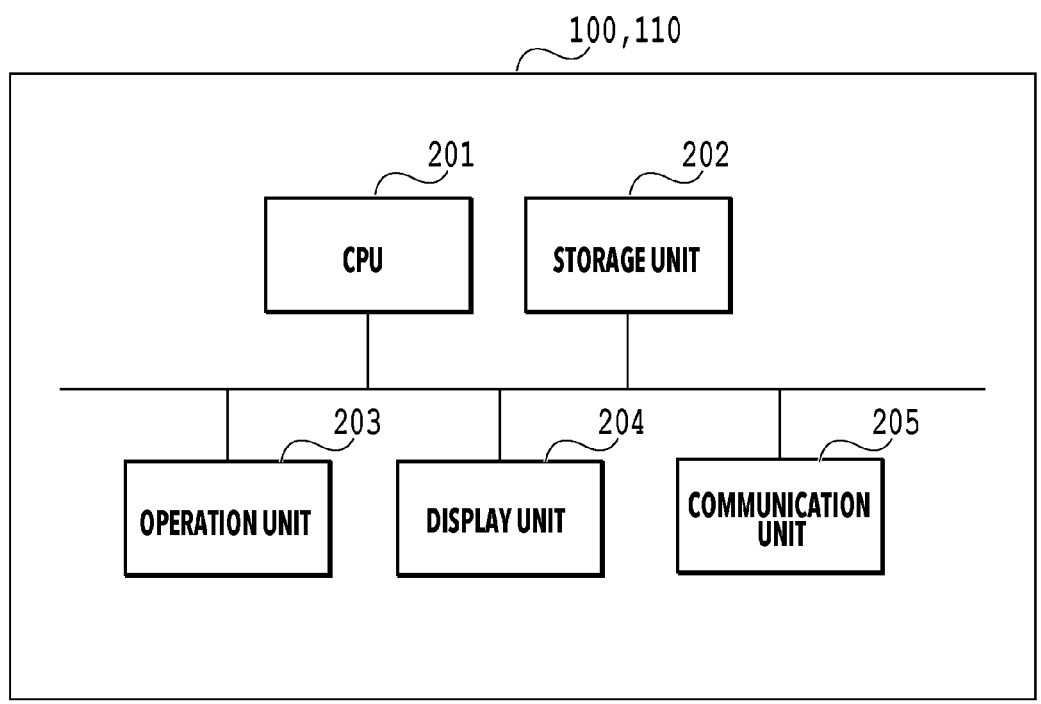
FIG. 2 is a diagram illustrating the hardware configuration of a notification management server and terminal device according to the present embodiments.

In FIG. 2, the hardware configuration of a notification management server and terminal device according to the present embodiments is illustrated. The notification management server 100 and the terminal device 110 include the CPU 201, the storage unit 202, the operation unit 203, the display unit 204, and the communication unit 205, which are interconnected by a system bus. The storage unit 202 stores a boot program necessary for launching the system, an application program to be executed by the CPU 201, etc., and serves as a storage area necessary for executing programs with the CPU 201. Input devices such as a mouse and keyboard for accepting inputs from the user are connected to the operation unit 203, and display devices for displaying notification information and the like are connected to the display unit 204. The communication unit 205 is connected to an external device or a network such as the Internet and controls communication.

Figure 3:
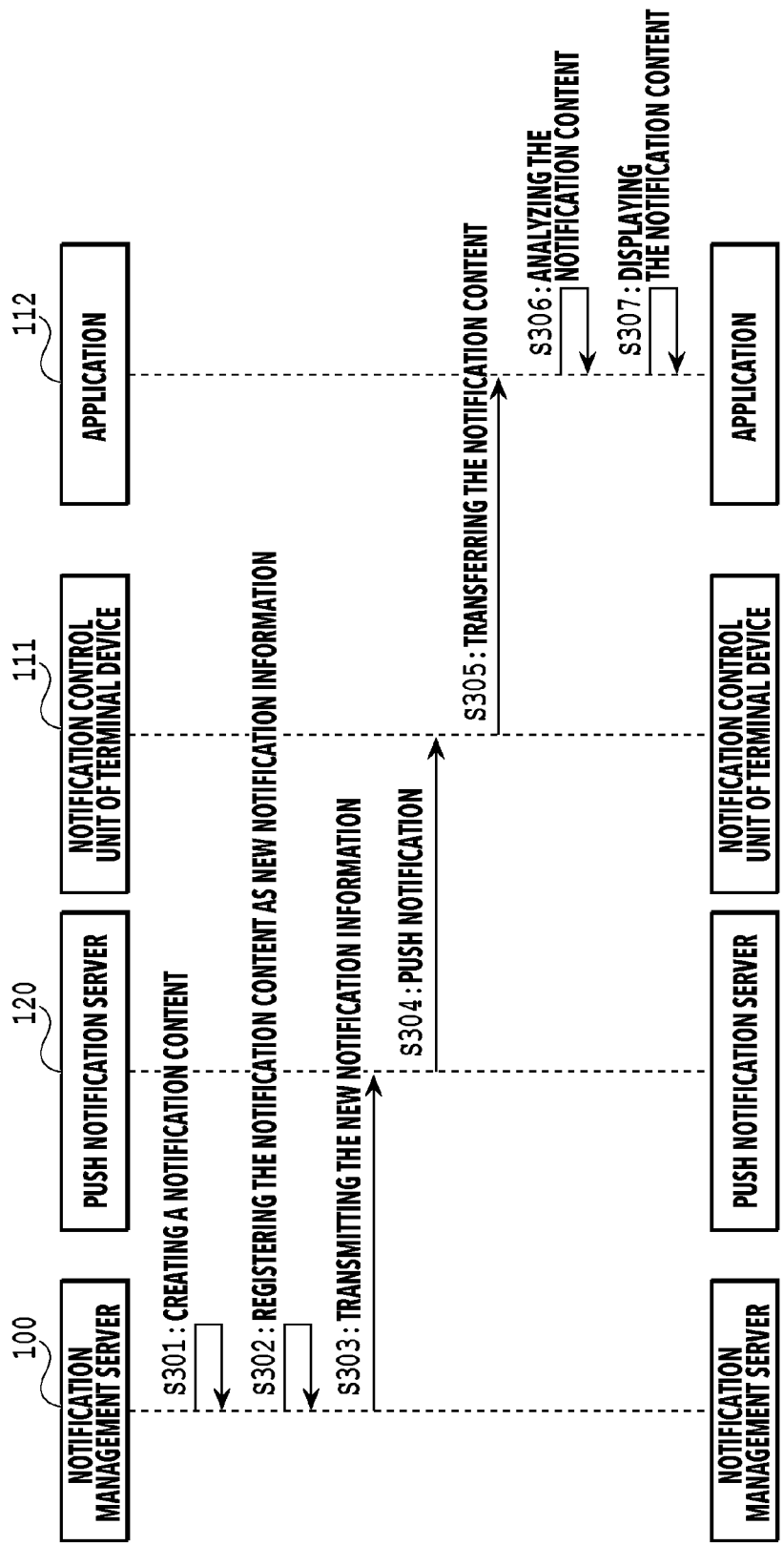
FIG. 3 is a sequence diagram of a notification service in the notification system of the present embodiments.

In FIG. 3, a sequence of a notification service in a notification system of the present embodiments is illustrated. The example of processing in which notification information created by the notification management server 100 is received by the application 112 of the terminal device 110 utilized by the user and the notification content is displayed is illustrated. The processing starts if the notification management server 100 creates a new notification content (S301). The created notification content is registered as new notification information (S302).

The new notification information is sent from the notification management server 100 to the push notification server 120 in a case where the set transmission date arrives or in response to an instruction from a notification administrator (S303). The push notification server 120 receives the notification sent from the notification management server 100 and transfers the notification as a push notification to the destination terminal device 110 (S304).

The push notification transmitted from the push notification server 120 is received by the notification control unit 111 of the terminal device 110. Here, in a case where the terminal device 110 is in the offline state, the push notification server 120 caches the one latest notification and sends the push notification again if the terminal device 110 turns to the online state. The notification control unit 111 of the terminal device 110 that has received the push notification notifies the application 112 of the reception of the notification, launches a process that is registered in the application 112 and can be executed at the timing of receiving the notification, and transfers the notification content (S305).

The application 112 analyzes the notification content by a process that can be executed at the timing of receiving the push notification (S306). The application 112 displays information for the user according to the analyzed notification content (S307).

First Embodiment

Figure 4:
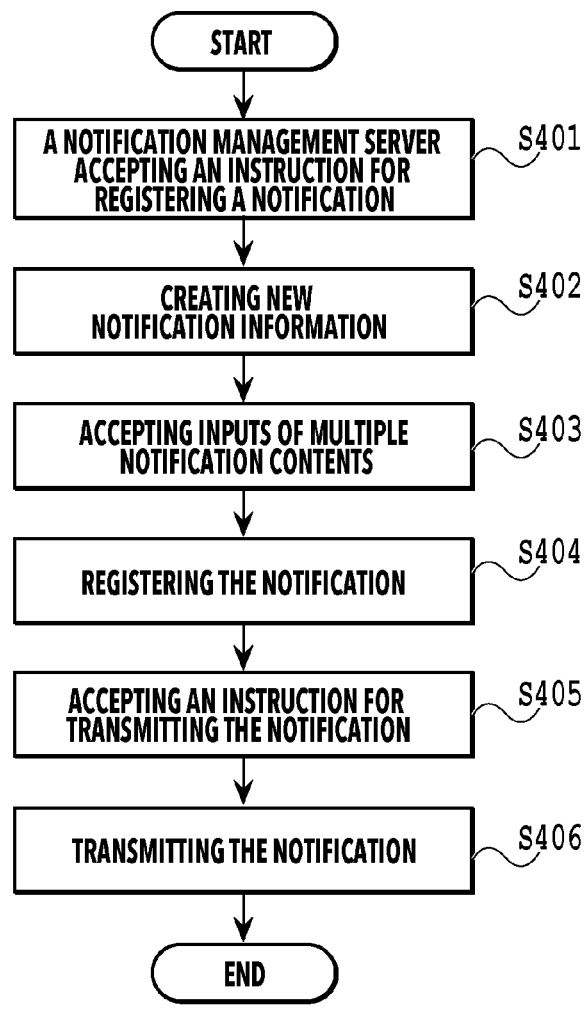
FIG. 4 is a flowchart illustrating the processing of a notification management server in the first embodiment.

In FIG. 4, processing of the notification management server in the first embodiment is illustrated. The flow of the processing in which the notification management server 100 creates new notification information and transmits the new notification information to the terminal device 110 is illustrated. The notification management server 100 starts the processing by accepting an instruction for registering a new notification content from a notification administrator (S401). The notification management server 100 creates new notification information (S402). In the new notification information, the notification administrator can set the transmission date of the notification, the user who is the target of the notification, the destination terminal device, etc. The notification management server 100 determines the transmission date and destination, based on the settings provided by the notification administrator.

The notification management server 100 accepts inputs of multiple notification contents in the notification information (S403). Thereby, as described later, in the processing performed at the timing where the application 112 of the terminal device 110 receives the notification, it is possible to display multiple notification contents based on one notification information. The notification contents include contents to be displayed on the terminal device 110, secondary information necessary for displaying the contents, information to be transferred to the application 112, etc., which can be arbitrarily set by the notification administrator.

The notification management server 100 registers the new notification information, in which one or more notification contents are set, in the notification information saving unit 101 (S404). In a case where the transmission date which is set in the notification information arrives or upon accepting a transmission instruction from the notification administrator (S405), the notification management server 100 transmits the corresponding notification information to the push notification server 120 (S406).

In FIG. 5, notification information in the first embodiment is illustrated. The notification information 500 includes information about the notification transmission date 510, notification transmission target 520, and notification content 530. Regarding the notification content 530, it is possible to set multiple notification contents for one notification information 500, and the two contents 531*a* and 531*b* are included as the notification content in FIG. 5. The contents 531*a* and 531*b* include notification messages to be displayed on the terminal device 110 of the user, information to be processed according to an operation at the timing of pressing the notification, etc. Such notification information 500 is information that can be arbitrarily set by the notification administrator.

Figure 6:
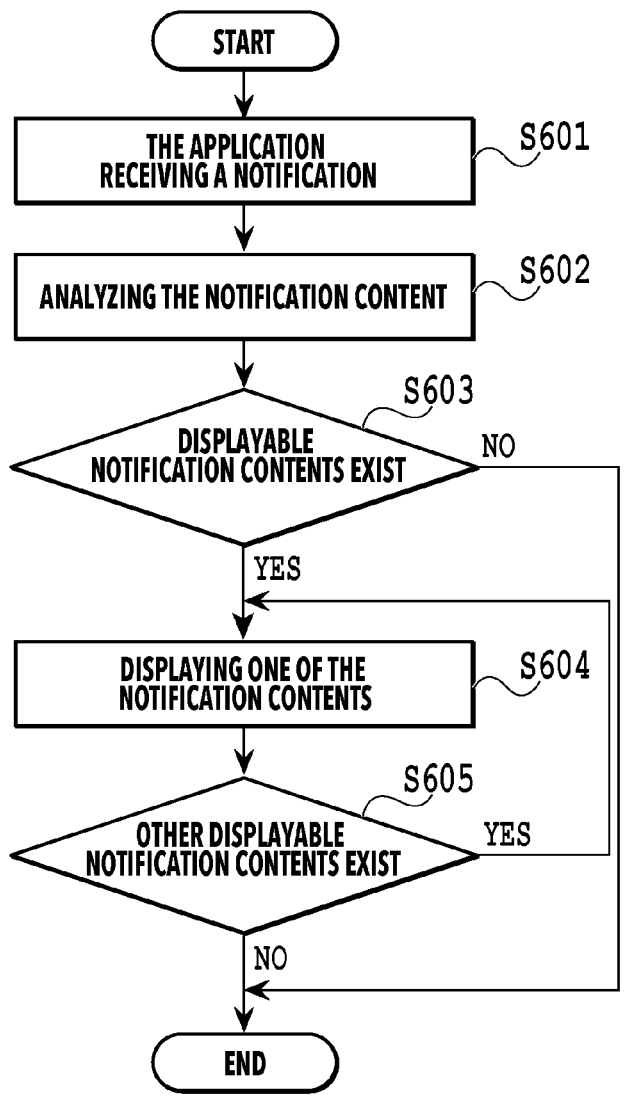
FIG. 6 is a flowchart illustrating the processing of an application in the first embodiment.

In FIG. 6, the processing performed by the application in the first embodiment is illustrated. The notification control unit 111 of the terminal device 110 that has received a push notification notifies the application 112 of the reception of the notification. If the application 112 is notified of the reception of the notification, the application 112 receives the notification content in a process that is registered in the application 112 and can be executed at the timing of receiving the notification (S601). The application 112 can notify the user of the received notification content by utilizing the notification control unit 111 of the terminal device 110 to display the received notification content on the display unit 204 of the terminal device 110. Further, the timing of utilizing the notification control unit 111 of the terminal device 110 to display the notification content for the user can be set to a given timing as long as the timing is during the execution of the application process, which is executed at the timing of receiving the notification.

The application 112 analyzes whether or not contents are included in the received notification content 530 (S602). The application 112 determines whether or not the contents included in the analyzed notification content include a notification message necessary for displaying, information to be processed according to an operation at the timing of pressing the notification, and the like (S603). In a case where there is no displayable notification contents, the processing is terminated.

In a case where displayable notification contents exist, one of the notification contents is displayed (S604). Thereafter, the application 112 determines whether or not other displayable contents are included (S605). If no other displayable contents are included, the processing is terminated, and, if other displayable contents are included, the processing is continued by returning to S604.

According to the first embodiment, the multiple notification contents 530 can be set in the notification information 500 to be transmitted by the notification management server 100. Accordingly, even in a case where the terminal device 110 is in the offline state, multiple notification contents can be included regardless of the restriction on the number of receivable notifications. Therefore, at the timing where the terminal device 110 transitions from the offline state to the online state, the application 112 can sequentially display the multiple notification contents included in a received notification.

On the other hand, if handshake communication is performed between the application 112 of the terminal device 110 and the push notification server 120, it is possible to check the notification information delivered to the terminal device out of the notification information transmitted by push notifications. However, in conventional notification services, all the notification information, or notification contents, must be checked, which increases the communication load. According to the first embodiment, multiple notification contents can be set in notification information, and thus the communication load on both terminal device 110 and push notification server 120 can be reduced.

Further, although it is also possible that the push notification server 120 periodically transmit only important information desired to be surely delivered to the user again, it is obvious that the transmission cost increases. Although it is also possible that the terminal device 110 obtains important information by utilizing the above-described fetch notification, the communication load increases since the application 112 periodically tries to obtain information even in a case where there is no information to be obtained. According to the first embodiment, during a period in which important information desired to be surely delivered exists, the important information is included in the notification contents of all the notification information to be transmitted, and thus it is possible to surely display the important information on the terminal device 110 without increasing the communication load.

Second Embodiment

In the first embodiment, the notification management server 100 can set the multiple notification contents 530 as the notification information 500. At the timing where the terminal device 110 transitions from the offline state to the online state, the application 112 can sequentially display the notification contents included in received notification information. Therefore, even though there is restriction on the number of notifications that can be cached on the push notification server side, important information desired to be surely delivered is included in the notification contents of all the notification information, and thus it is possible to surely make the terminal device 110 of the user receive and display the important information.

However, if important information is included in the notification contents of all the notification information, the same notification content 530 may be received and displayed multiple times on the terminal device 110 of the user, which can decrease usability. Therefore, in the second embodiment, information for identifying a notification content can be set in the notification content. The application 112 that has received a notification uses this identification information to refer to the display history of the notification content which is saved in the application data saving unit 113, so as to determine whether or not to display the notification content. Accordingly, it is possible to suppress notifications with the same contents from being displayed. The processing in which the notification management server 100 creates new notification information and sends the new notification information to the terminal device 110 is the same as that of the first embodiment illustrated in FIG. 4, and thus the explanation thereof is omitted.

In FIG. 7, notification information in the second embodiment is illustrated. The notification information 700 includes information about the notification transmission date 710, notification transmission target 720, and notification content 730. Regarding the notification content 730, it is possible to set multiple notification contents for one notification information 700, and the two contents 731*a* and 731*b* are included as the notification content in FIG. 7. The contents 731*a* and 731*b* include notification messages to be displayed on the terminal device 110 of the user, information to be processed according to an operation at the timing of pressing the notification, etc. Such notification information 700 is information that can be arbitrarily set by the notification administrator.

Furthermore, the notification content 730 includes the identification information 732a and 732b that can uniquely specify the respective notification contents. In the second embodiment, identifiers configured of predetermined given alphanumeric characters are set as the identification information. The identification information is not limited to such identifiers and may be given character information as long as it is possible to specify given information. For example, as illustrated in FIG. 7, identification information may be set only for important information that provides a notification of an update, and identification information may not be set for other notification contents. On the other hand, the identification information 732 may be set for all the notification contents 730. The identification information 732a and 732b are utilized in the processing performed at the timing where the application 112 receives a notification, which is described later with reference to FIG. 8, so as to determine whether or not the notification content has already been displayed.

Figure 8:
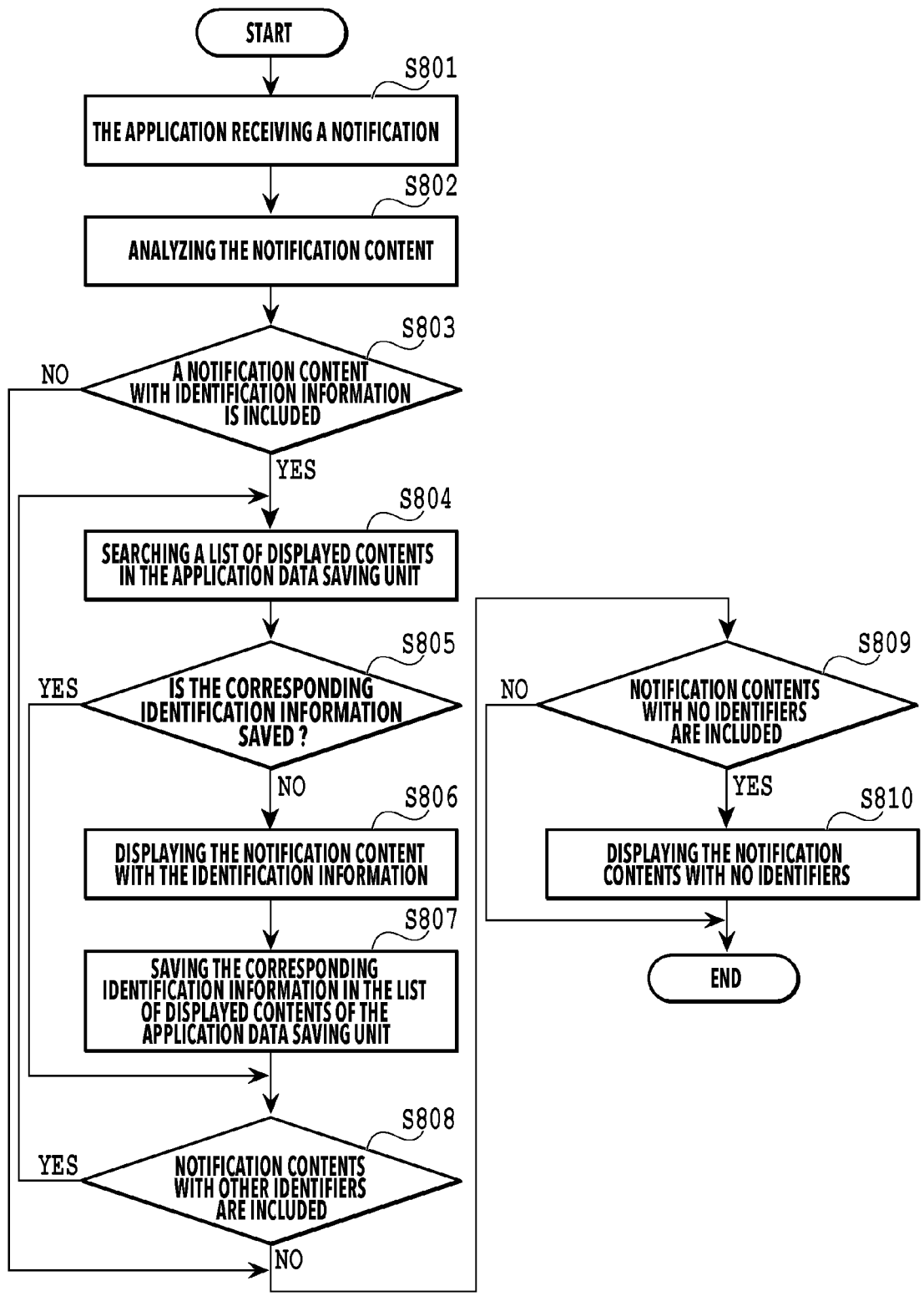
FIG. 8 is a flowchart illustrating the processing of an application in the second embodiment.

In FIG. 8, the processing performed by the application in the second embodiment is illustrated. The notification control unit 111 of the terminal device 110 that has received a push notification notifies the application 112 of the reception of the notification. If the application 112 is notified of the reception of the notification, the application 112 receives the notification content in a process which is registered in the application 112 and can be executed at the timing of receiving the notification (S801). The application 112 can notify the user of the received notification content by utilizing the notification control unit 111 of the terminal device 110 to display the received notification content on the display unit 204 of the terminal device 110. Further, the timing of utilizing the notification control unit 111 of the terminal device 110 to display the notification content for the user can be set to a given timing as long as the timing is during the execution of the application process, which is executed at the timing of receiving the notification.

The application 112 performs an analysis as to whether or not the received notification content 730 includes the identification information 732 and the contents 731 (S802). The application 112 determines whether or not notification contents with identification information 732 are included in the analyzed notification content 730 (S803), and, in a case where notification contents with identification information are not included, the processing proceeds to S809.

In a case where notification contents 730 with identification information 732 are included, the application 112 searches a list of identification information of the previously displayed notification contents saved in the application data saving unit 113 (hereinafter referred to as a list of displayed contents) (S804). Whether or not the identification information 732 analyzed in S802 is saved in the list of displayed contents is determined (S805). In a case where the corresponding identification information 732 is saved, the processing proceeds to S808. In a case where the corresponding identification information 732 is not saved in the list of displayed contents, the application 112 displays the notification contents 730 specified by the identification information 732 (S806). The application 112 saves the identification information 732 of the displayed notification contents 730 in the list of displayed contents of the application data saving unit 113 (S807).

Next, the application 112 determines whether or not notification contents 730 with other identification information 732 are included (S808). In a case where notification contents 730 with other identification information 732 are included, the processing returns to S804. In a case where notification contents 730 with other identification information 732 are not included, the application 112 determines whether or not notification contents with no identification information 732 are included (S809), and, in a case where notification contents with no identification information 732 are not included, the processing is terminated. In a case where notification contents with no identification information 732 are included, the application 112 displays the notification contents 730 with no identification information 732 (S810). Here, in a case where multiple notification contents 730 with no identification information 732 are included, the processing of S809 and S810 may be repeated.

According to the second embodiment, together with the multiple notification contents 730, the identification information 732 for specifying the notification contents 730 are set in the notification information 700 transmitted by the notification management server 100. The application 112 of the terminal device 110 searches the list of displayed contents saved in the application data saving unit 113 and displays the notification contents 730 only in a case where corresponding identification information 732 does not exist. During a period in which important information desired to be surely delivered to the user exists, the important information is included in the notification contents of all the notification information to be transmitted, and thus it is possible to surely display the important information on the terminal device of the user. In addition, since the notification contents that have been displayed in the past are not displayed, it is possible to prevent the same notification contents from being displayed redundantly.

Third Embodiment

In the first embodiment, the notification management server 100 can set the multiple notification contents 530 as the notification information 500. At the timing where the terminal device 110 transitions from the offline state to the online state, the application 112 can sequentially display the notification contents included in received notification information. Therefore, even though there is restriction on the number of notifications that can be cached on the push notification server side, important information desired to be surely delivered is included in the notification contents of all the notification information, and thus it is possible to surely make the terminal device 110 of the user receive and display the important information.

However, each time the notification administrator creates notification information, important information needs to be set for all the notification information. Therefore, in the third embodiment, it is possible to set a period during which specific notification contents are automatically added to notification information (hereinafter referred to as an addition period). By setting an addition period for important information, the notification contents of the notification information during the addition period are transmitted to the terminal device 110 of the user with the important information included every time. Since the processing performed at the timing where the application 112 receives a notification is the same as that of the first embodiment illustrated in FIG. 6, the explanation thereof is omitted.

Figure 9:
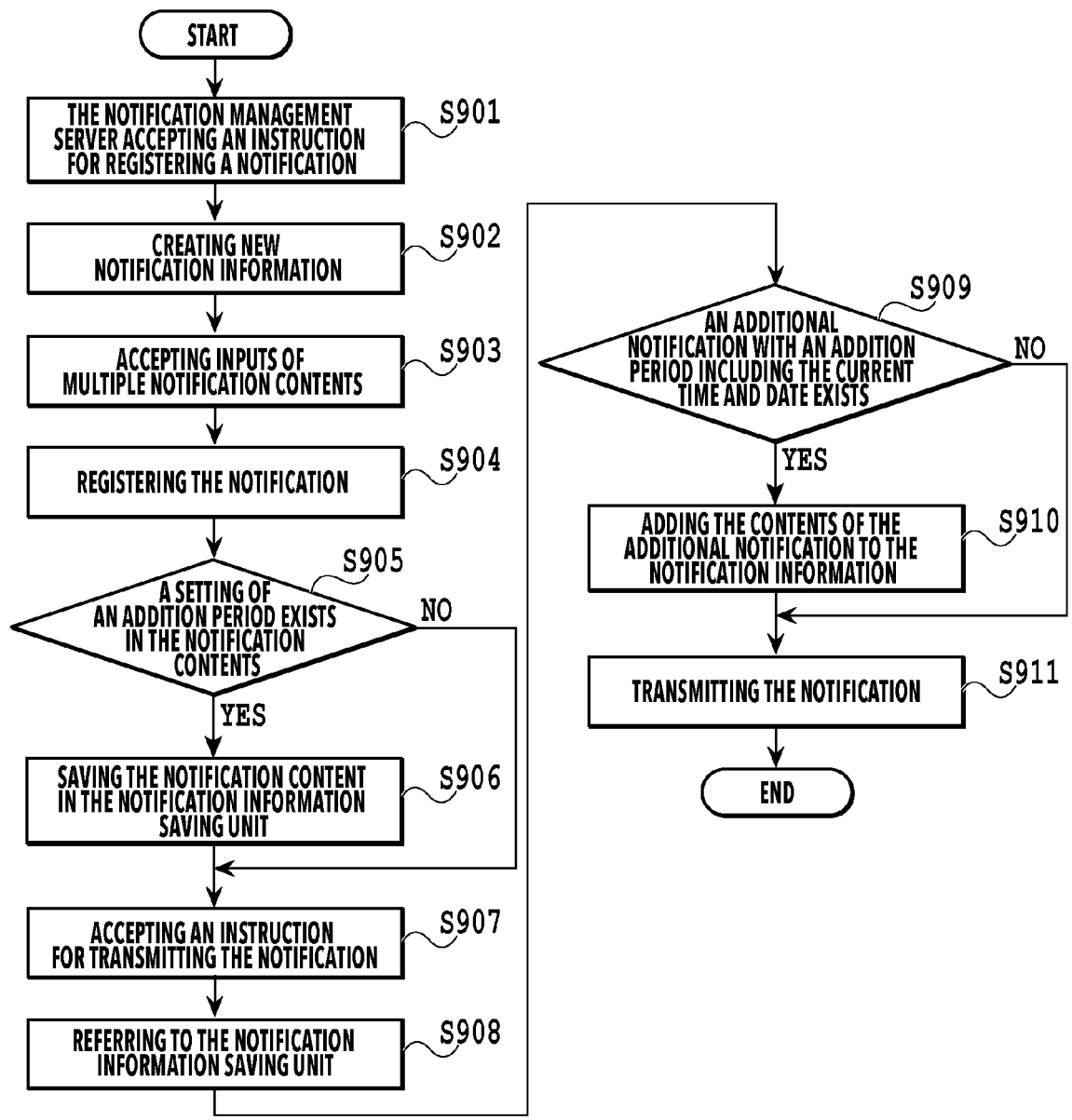
FIG. 9 is a flowchart illustrating the processing of a notification management server in the third embodiment.

In FIG. 9, processing of the notification management server in the third embodiment is illustrated. The flow of the processing in which the notification management server 100 creates new notification information and transmits the new notification information to the terminal device 110 is illustrated. The notification management server 100 starts the processing by accepting an instruction for registering a new notification content from the notification administrator (S901). The notification management server 100 creates new notification information (S902). In the new notification information, the notification administrator can set the transmission date of the notification, the user who is the target of the notification, the destination terminal device, etc. The notification management server 100 determines the transmission date and destination, based on the settings provided by the notification administrator.

The notification management server 100 accepts inputs of multiple notification contents in the notification information (S903). The notification contents include contents to be displayed on the terminal device 110, secondary information necessary for displaying the contents, information to be transferred to the application 112, etc., which can be arbitrarily set by the notification administrator. The notification management server 100 registers the new notification information, in which one or more notification contents are set, in the notification information saving unit 101 (S904).

As described later in FIG. 10, the notification management server 100 determines whether or not the notification contents 1030 of the notification information 1000 registered in S904 include a setting of the addition period 1031 (S905). In a case where settings of the addition period 1031 do not exist, the processing proceeds to S907. In a case where a setting of the addition period 1031 exists, the notification management server 100 saves the corresponding notification content 1030 (hereinafter referred to as an additional notification) in the notification information saving unit 101 (S906).

In a case where the notification transmission date which is set in the notification information arrives or upon accepting a transmission instruction from the notification administrator (S907), the notification management server 100 refers to the notification information in the notification information saving unit 101 (S908). The notification management server 100 determines whether or not an additional notification with an addition period including the current date and time exists in the notification information saving unit 101 (S909). In a case where additional notifications with addition periods including the current date and time do not exist, the processing proceeds to S911. In a case where an additional notification with an addition period including the current date and time exists, the notification management server 100 adds the additional notification to the new notification information (S910). Then, the corresponding notification information is sent to the push notification server 120 (S911). Note that the notification administrator can also create new notification information that only includes an additional notification. Further, even in a case where an additional notification with an addition period including the current date and time exists, the notification administrator can also exclude the additional notification.

In FIG. 10, notification information in the third embodiment is illustrated. The notification information 1000 includes information about the notification transmission date 1010, notification transmission target 1020, and notification content 1030. Regarding the notification content 1030, it is possible to set multiple notification contents for one notification information 1000, and, in FIG. 10, the contents 1031a and 1031b are included together with the respective addition periods 1032a and 1032b. The contents 1031a and 1031b include notification messages to be displayed on the terminal device 110 of the user, information to be processed according to an operation at the timing of pressing the notification, etc. Such notification information 1000 is information that can be arbitrarily set by the notification administrator.

Here, although the addition periods 1032a and 1032b are represented by year, month, and day, it is also possible that the addition periods 1032a and 1032b are represented by date and time including a time period or are represented by given parameters such as on a monthly basis. Although the addition period 1032b of the notification content with no addition period is blank, it is also possible that the addition period 1032b is represented by given numerical values or characters. The addition periods 1032a and 1032b are utilized to automatically add an additional notification with an addition period including the current date and time at the timing where the notification management server 100 creates new notification information and sends the new notification information to the push notification server 120.

According to the third embodiment, the notification management server 100 can set the multiple notification contents 1030 including the addition periods 1032 in the notification information 1000. Since an additional notification with an addition period including the current date and time is automatically added to notification information, the burden on the notification administrator can be reduced, and the multiple notification contents 1030 including important information desired to be surely delivered to the user can be displayed on the application 112.

Fourth Embodiment

In the first embodiment, the notification management server 100 can set the multiple notification contents 530 as the notification information 500. At the timing where the terminal device 110 transitions from the offline state to the online state, the application 112 can sequentially display the notification contents included in received notification information. Therefore, even though there is restriction on the number of notifications that can be cached on the push notification server side, important information desired to be surely delivered is included in the notification contents of all the notification information, and thus it is possible to surely make the terminal device 110 of the user receive and display the important information.

However, in a case where the important information is useful to the user only under specific environments and conditions, it is desirable that the notification contents are displayed only in a case where the specific environments and conditions are met. Therefore, in the fourth embodiment, a condition for displaying a notification content on the terminal device 110 of the user is set in the notification content, and thus, even in a case of receiving a notification including multiple notification contents, the notification contents are displayed on the terminal device 110 of the user only in a case where their display condition is satisfied. The processing in which the notification management server 100 creates new notification information and sends the new notification information to the terminal device 110 is the same as that of the first embodiment illustrated in FIG. 4, and thus the explanation thereof is omitted.

In FIG. 11, notification information in the fourth embodiment is illustrated. The notification information 1100 includes information about the notification transmission date 1110, notification transmission target 1120, and notification content 1130. Regarding the notification content 1130, it is possible to set multiple notification contents for one notification information 1100, and, in FIG. 11, the contents 1131a and 1131b are included together with the respective display conditions 1132a and 1132b. The contents 1131a and 1131b include notification messages to be displayed on the terminal device 110 of the user, information to be processed according to an operation at the timing of pressing the notification, etc. Such notification information 1100 is information that can be arbitrarily set by the notification administrator.

The display conditions 1132a and 1132b are utilized by the application 112 to determine whether or not to display the notification contents, so that the notification contents are displayed under appropriate environments and conditions. For example, in a case where the notification content 1130 is guidance for dealing with a problem of an application that occurs under a specific OS environment, the OS version can be set as the display condition 1132a. For example, in a case where the notification content 1130 is guidance for dealing with a display problem of an application that occurs in a specific country or language used, the country or language used can be set as a display condition. For example, in a case where the notification content 1130 is guidance for dealing with an operational problem of an application that occurs in a specific connection device or connection interface, the name of the connection device or the type of connection interface can be set as a display condition. For example, in a case where the notification content 1130 is guidance for dealing with a display problem of an application that occurs in a case where a specific consumable is utilized in a connection device, the model number of the consumable used in the connection device can be set as the display condition 1132b.

Figure 12:
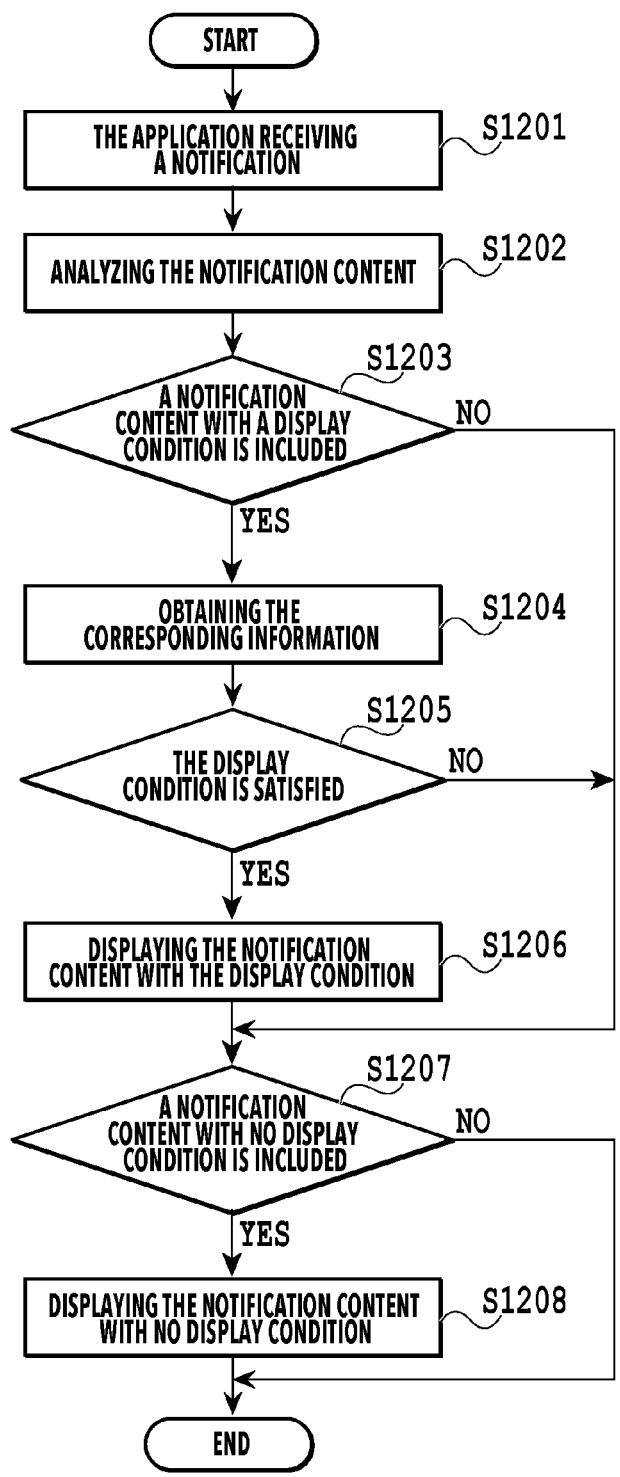
FIG. 12 is a flowchart illustrating the processing of an application in the fourth embodiment.

In FIG. 12, the processing performed by the application in the fourth embodiment is illustrated. The notification control unit 111 of the terminal device 110 that has received a push notification notifies the application 112 of the reception of the notification. If the application 112 is notified of the reception of the notification, the application 112 receives the notification content in a process which is registered in the application 112 and can be executed at the timing of receiving the notification (S1201). The application 112 can notify the user of the received notification content by utilizing the notification control unit 111 of the terminal device 110 to display the received notification content on the display unit 204 of the terminal device 110. Further, the timing of utilizing the notification control unit 111 of the terminal device 110 to display the notification content for the user can be set to a given timing as long as the timing is during the execution of the application process, which is executed at the timing of receiving the notification.

The application 112 performs an analysis as to whether or not the received notification content 1130 includes the display conditions 1132 and the contents 1131 (S1202). The application 112 determines whether or not notification contents with display conditions 1132 are included in the analyzed notification content 1130 (S1203), and, in a case where notification contents with display conditions are not included, the processing proceeds to S1207.

In a case where a notification content with the display condition 1132 is included, the application 112 obtains the information corresponding to the display condition (S1204). If the OS version is set as the display condition 1132a as described above, for example, the application 112 obtains the version information from the OS. Here, the obtainment of information may be performed dynamically in a process that can be executed by the application 112 at the timing of receiving the notification. Further, it is also possible that the application 112 refers to information previously obtained and saved in the application data saving unit 113. Here, as described above in the example, the obtained information includes an OS version, a country, a language used, a name of a connection device, a type of connection interface, a model number of a consumable utilized in a connection device, etc.

The application 112 determines whether or not the information obtained in S1204 satisfies the display condition 1132 (S1205), and, in a case where the display condition 1132 is not satisfied, the processing proceeds to S1207. In a case where the display condition 1132 is satisfied, the application 112 displays the notification content 1130 with the display condition 1132 (S1206).

Next, the application 112 determines whether or not notification contents with no display conditions are included in the notification content (S1207), and, in a case where notification contents with no display conditions are not included, the processing is terminated. In a case where a notification content with no display condition is included, the application 112 displays the notification content with no display condition (S1208).

According to the fourth embodiment, the multiple notification contents 1130 including the display conditions 1132 are set in the notification information 1100 to be transmitted by the notification management server 100. The application 112 of the terminal device 110 can display the multiple notification contents 1130 including important information desired to be surely delivered to the user only in a case where their appropriate environment or condition is satisfied. Note that, as in the second embodiment, by using identification information together, it is also possible to prevent the same notification contents from being displayed redundantly.

Fifth Embodiment

In the first embodiment, the notification management server 100 can set the multiple notification contents 530 as the notification information 500. At the timing where the terminal device 110 transitions from the offline state to the online state, the application 112 can sequentially display the notification contents included in received notification information. Therefore, even though there is restriction on the number of notifications that can be cached on the push notification server side, important information desired to be surely delivered is included in the notification contents of all the notification information, and thus it is possible to surely make the terminal device 110 of the user receive and display the important information.

However, displaying multiple notification contents sequentially by the application 112, i.e., simply displaying the multiple notification contents in a given order, does not always make it easy for the user to recognize important information. Therefore, in the fifth embodiment, assuming a case where multiple notification contents are displayed on the terminal device 110 of the user, a continuous-display interval for displaying can be set in a notification content in a case where important information is included in the notification content of notification information. The terminal device 110 of the user firstly displays notification contents in which continuous-display intervals are set and, thereafter, sequentially displays the multiple other notification contents according to the set given intervals. The processing in which the notification management server 100 creates new notification information and sends the new notification information to the terminal device 110 is the same as that of the first embodiment illustrated in FIG. 4, and thus the explanation thereof is omitted.

In FIG. 13, notification information in the fifth embodiment is illustrated. The notification information 1300 includes information about the notification transmission date 1310, notification transmission target 1320, and notification content 1330. Regarding the notification content 1330, it is possible to set multiple notification contents for one notification information 1300, and, in FIG. 13, the contents 1331a and 1331b are included together with the respective continuous-display intervals 1332a and 1332b. The contents 1331a and 1331b include notification messages to be displayed on the terminal device 110 of the user, information to be processed according to an operation at the timing of pressing the notification, etc. Such notification information 1300 is information that can be arbitrarily set by the notification administrator.

Here, although the continuous-display intervals 1332a and 1332b are represented by minutes, it is also possible that the continuous-display intervals 1332a and 1332b are represented by given parameters such as seconds and hours. Although the continuous-display interval 1332b of the notification content with no continuous-display interval is blank, it is also possible that the continuous-display interval 1332b is represented by given numerical values or characters. The continuous-display intervals 1332a and 1332b are utilized by the application 112 to display the notification contents, so that the notification contents are displayed at appropriate timings.

Figure 14:
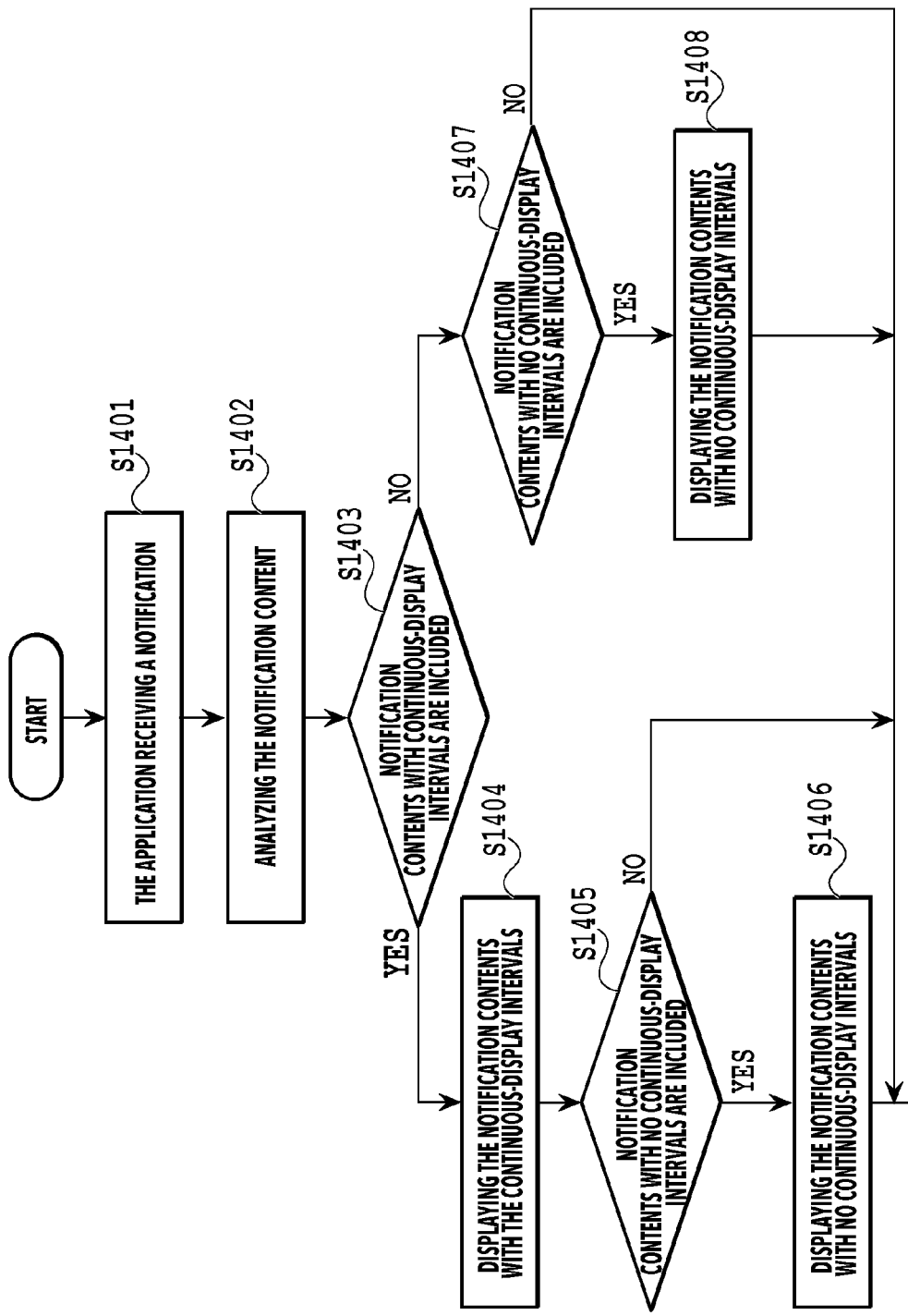
FIG. 14 is a flowchart illustrating the processing of an application in the fifth embodiment.

In FIG. 14, the processing performed by the application in the fifth embodiment is illustrated. The notification control unit 111 of the terminal device 110 that has received a push notification notifies the application 112 of the reception of the notification. If the application 112 is notified of the reception of the notification, the application 112 receives the notification content in a process which is registered in the application 112 and can be executed at the timing of receiving the notification (S1401). The application 112 can notify the user of the received notification content by utilizing the notification control unit 111 of the terminal device 110 to display the received notification content on the display unit 204 of the terminal device 110. Further, the timing of utilizing the notification control unit 111 of the terminal device 110 to display the notification content for the user can be set to a given timing as long as the timing is during the execution of the application process, which is executed at the timing of receiving the notification.

The application 112 performs an analysis as to whether or not the received notification content 1330 includes continuous-display intervals 1332 and contents 1331 (S1402). The application 112 determines whether or not notification contents with continuous-display intervals 1332 are included in the analyzed notification content (S1403), and, in a case where notification contents with continuous-display intervals are included, the processing proceeds to S1404.

In a case where notification contents with continuous-display intervals are not included, whether or not notification contents with no continuous-display intervals are included is determined (S1407). In a case where notification contents with no continuous-display intervals are not included, the processing is terminated, and, in a case where a notification contents with no continuous-display intervals are included, the application 112 sequentially displays the notification contents with no continuous-display intervals (S1408).

In the processing performed in S1403, in a case where notification contents with continuous-display intervals are included, the application 112 displays the notification contents with the continuous-display intervals (S1404). Next, the application 112 determines whether or not notification contents with no continuous-display intervals are included (S1405). In a case where notification contents with no continuous-display intervals are not included, the processing is terminated. In a case where notification contents with no continuous-display intervals are included, the application 112 sequentially displays the notification contents with no continuous-display intervals (S1406) according to the intervals of the continuous-display intervals 1332 included in the notification contents 1330 which are displayed in the processing performed in S1404. That is, of the notification information 1300, the contents 1331a of the notification content with the continuous-display interval 1332a are displayed, and then the contents 1331b of the notification content with no continuous-display interval is displayed after the continuous-display interval 1332a elapses.

According to the fifth embodiment, the multiple notification contents 1330 including the continuous-display intervals 1332 are set in the notification information 1300 to be transmitted by the notification management server 100. Since the application 112 of the terminal device 110 sets the continuous-display intervals 1332 in the notification content 1330 including important information desired to be surely delivered to the user, it is possible to display the important information and then display other notification contents at given timings. Note that, as in the second embodiment, by using identification information together, it is also possible to prevent the same notification contents from being displayed redundantly. Furthermore, as in the fourth embodiment, by using settings of display conditions together, it is possible to display the notification contents only in a case where their appropriate environment or condition is satisfied.

Sixth Embodiment

In the first embodiment, the notification management server 100 can set the multiple notification contents 530 as the notification information 500. At the timing where the terminal device 110 transitions from the offline state to the online state, the application 112 can sequentially display the notification contents included in received notification information. Therefore, even though there is restriction on the number of notifications that can be cached on the push notification server side, important information desired to be surely delivered is included in the notification contents of all the notification information, and thus it is possible to surely make the terminal device 110 of the user receive and display the important information.

However, if important information is included in the notification contents of all the notification information, the same notification content 530 may be received and displayed multiple times on the terminal device 110 of the user, which can decrease usability. Therefore, in the sixth embodiment, a target period in which the terminal device 110 is supposed to display the notification content can be set in a notification content. The application 112 that has received a notification refers to the last display date and time of the notification content saved in the application data saving unit 113 to determine whether or not to display the notification content. Accordingly, it is possible to suppress notifications with the same contents from being displayed. The processing in which the notification management server 100 creates new notification information and sends the new notification information to the terminal device 110 is the same as that of the first embodiment illustrated in FIG. 4, and thus the explanation thereof is omitted.

In FIG. 15, notification information in the sixth embodiment is illustrated. The notification information 1500 includes information about the notification transmission date 1510, notification transmission target 1520, and notification content 1530. Regarding the notification content 1530, it is possible to set multiple notification contents for one notification information 1500, and, in FIG. 15, the contents 1531*a* and 1531*b* are included together with the respective target periods 1532*a* and 1532*b*. The contents 1531*a* and 1531*b* include notification messages to be displayed on the terminal device 110 of the user, information to be processed according to an operation at the timing of pressing the notification, etc. Such notification information 1500 is information that can be arbitrarily set by the notification administrator.

Here, although the target periods 1532*a* and 1532*b* are represented by year, month, and day, it is also possible that the target periods 1532*a* and 1532*b* are represented by date and time including a time period or are represented by given parameters such as on a monthly basis. Although the target period 1532*b* of the notification content with no target period is blank, it is also possible that the target period 1532*b* is represented by given numerical values or characters. At the timing where the application 112 receives the notification information 1500, the target periods 1532*a* and 1532*b* are utilized, in the determination as to whether or not to display the notification, and compared with the last display date and time information of the notification saved in the application data saving unit 113.

Figure 16:
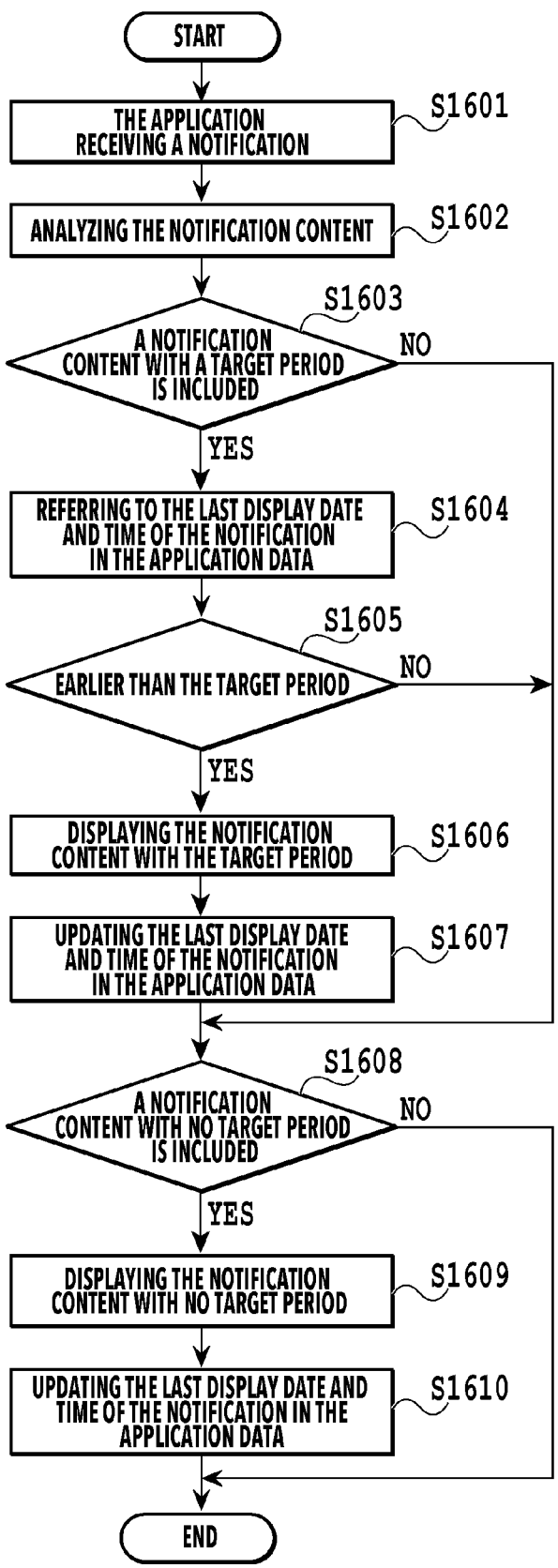
FIG. 16 is a flowchart illustrating the processing of an application in the sixth embodiment.

In FIG. 16, the processing performed by the application in the sixth embodiment is illustrated. The notification control unit 111 of the terminal device 110 that has received a push notification notifies the application 112 of the reception of the notification. If the application 112 is notified of the reception of the notification, the application 112 receives the notification content in a process which is registered in the application 112 and can be executed at the timing of receiving the notification (S1601). The application 112 can notify the user of the received notification content by utilizing the notification control unit 111 of the terminal device 110 to display the received notification content on the display unit 204 of the terminal device 110. Further, the timing of utilizing the notification control unit 111 of the terminal device 110 to display the notification content for the user can be set to a given timing as long as the timing is during the execution of the application process, which is executed at the timing of receiving the notification.

The application 112 performs an analysis as to whether or not the received notification content 1530 includes target periods 1532 and contents 1531 (S1602). The application 112 determines whether or not notification contents with target periods 1532 are included in the analyzed notification content 1530 (S1603), and, in a case where notification contents with target periods are not included, the processing proceeds to S1608.

In a case where a notification content with the target period 1532 is included, the application 112 refers to the last display date and time information of the notification saved in the application data saving unit 113 (S1604). The last display date and time information saved in the application data saving unit 113 is the display date and time where the notification content received by the terminal device 110 is lastly displayed. The application 112 determines whether or not the last display date and time of the notification is earlier than the target period 1532 (S1605). In a case where the last display date and time of the notification is not earlier than the target period 1532, i.e., in a case where the notification is displayed during the target period, the processing proceeds to S1608.

In a case where the last display date and time of the notification is earlier than the target period 1532, i.e., in a case where the notification has not been displayed during the target period, the application 112 displays the notification content with the target period (S1606). Furthermore, the application 112 updates the last display date and time of the notification saved in the application data saving unit 113 to the current date and time (S1607).

Next, the application 112 determines whether or not notification contents with no target periods are included in the notification content (S1608), and, in a case where notification contents with no target periods are not included, the processing is terminated. In a case where a notification content with no target period is included, the application 112 displays the notification content with no target period (S1609). Furthermore, the application 112 updates the last display date and time of the notification saved in the application data saving unit 113 to the current date and time (S1610).

According to the sixth embodiment, the multiple notification contents 1530 including the target periods 1532 are set in the notification information 1500 to be transmitted by the notification management server 100. The application 112 of the terminal device 110 compares the received notification contents 1530 including the target periods 1532 with the last display dates and times of the notifications saved in the application data saving unit 113, so that the notification contents 1530 are displayed only in a case where there is no display history in the target periods. During a period in which important information desired to be surely delivered to the user exists, the important information is included in the notification contents of all the notification information to be transmitted, and thus it is possible to surely display the important information on the terminal device of the user. In addition, since the notification contents that have been displayed in target periods are not displayed, it is possible to prevent the same notification contents from being displayed redundantly. Note that, as in the fourth embodiment, it is also possible to display notification contents only in the case where their display conditions are satisfied or, as in the fifth embodiment, it is also possible to additionally execute a setting of a continuous-display interval in the case where multiple notification contents are displayed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, it is possible to set multiple notification contents for notification information to be transmitted by a push notification, and, even in a case where the number of notifications that can be cached in a push notification server is limited, the information desired to be surely delivered to a user can be displayed on a terminal device.

This application claims the benefit of Japanese Patent Application No. 2022-074431, filed Apr. 28, 2022, which is hereby incorporated by reference wherein in its entirety.

What is claimed is:

1. A control method of a terminal device configured to be able to communicate with a management server configured to send a plurality of pieces of notification information that includes first information for displaying a first content and in which the terminal device is set as a destination, comprising:
   receiving in a case where the terminal device turns into an online state after the plurality of pieces of notification information are sent by the management server while the terminal device is in an offline state, only part of the notification information among the plurality of pieces of notification information sent by the management server while the terminal device is in the offline state; and
   executing, in a case where the part of the notification information received by the terminal device includes at least the first information and second information for displaying a second content, predetermined control to execute displaying the first content based on the first information before displaying the second content based on the second information,
   wherein the predetermined control causes the terminal device to display the first content and to display the second content after displaying the first content.

2. The control method according to claim 1,
wherein notification of the first content is controlled so as not to be provided by the terminal device in a case where notification information including at least the first information is further received by the terminal device after displaying the first content on the terminal device based on the reception of the part of the notification information.

3. The control method according to claim 2 further comprising
   executing a determination process for determining whether or not the displaying of the first content is already provided in the terminal device.

4. The control method according to claim 3,
wherein the notification information including the first information includes identification information for identifying information corresponding to the first information, and wherein the determination process is executed based on whether the identification information corresponding to the first information is already saved in the terminal device.

5. The control method according to claim 1,
wherein the displaying the second content is executed by the predetermined control after the first content is displayed for a predetermined time period.

6. The control method according to claim 5,
wherein the notification information including the first information includes time period information related to a time period in which the first content is displayed, and
wherein the predetermined time period is a time period indicated by the time period information.

7. The control method according to claim 5,
wherein the notification information including at least the first information and the second information includes time period information related to a time period in which the first content is displayed, but does not include time period information related to a time period in which the second content is displayed, and
wherein the predetermined time is indicated by the time period information.

8. The control method according to claim 1,
wherein the notification information includes first condition information indicating a condition for displaying the first content, and
wherein the displaying the first content is executed in a case where the condition indicated by the first condition information is satisfied.

9. The control method according to claim 1,
wherein the displaying the first content and the second content are provided by push notifications.

10. The control method according to claim 1,
wherein, in a case where the terminal device is in an offline state, even if the notification information in which the terminal device is set as a destination is sent by the management server, the notification information is not received by the terminal device, and
wherein, in a case where the terminal device is in an online state, if the notification information in which the terminal device is set as a destination is sent by the management server, the notification information is received by the terminal device.

11. The control method according to claim 10,
wherein, in a case where the terminal device is in the offline state, if the notification information in which the terminal device is set as a destination is sent by the management server, the notification information is cached in a notification server which is different from the management server,
wherein, in a case where the terminal device is in the online state, the notification information cached in the notification server is received by the terminal device, and
wherein the part of the notification information is the notification information cached in the notification server of the plurality of pieces of information sent by the management server.

12. The control method according to claim 11,
wherein, regarding the notification information in which the terminal device is set as a destination, the number of notification information cached by the notification server is limited.

13. The control method according to claim 1,
wherein the first content includes a content for a notification of an update.

14. The control method according to claim 1,
wherein the second content includes a content related to contents for printing.

15. The control method according to claim 1,
wherein, in a case where an operating system of the terminal device receives the part of the notification information, the operating system transfers the part of the notification information to a predetermined application of the terminal device, and
wherein the application executes the predetermined control.

16. A terminal device configured to be able to communicate with a management server configured to send a plurality of pieces of notification information that includes first information for displaying a first content and in which the terminal device is set as a destination, comprising:
a reception unit configured to receive, in a case where the terminal device turns into an online state after the plurality of pieces of notification information are sent by the management server while the terminal device is in an offlien state, only part of the notification information among the plurality of pieces of notification information sent by the management server while the terminal device is in the offline state; and
an execution unit configured to execute, in a case where the part of the notification information received by the terminal device includes at least the first information and second information for displaying a second content, predetermined control to execute displaying the first content based on the first information before displaying the second content based on the second information,
wherein the predetermined control is control to display the first content and display the second content after displaying the first content.

17. A system including a terminal device and a management server,
wherein the management server comprises
a sending unit configured to send a plurality of pieces of notification information, which includes first information for displaying a first content and in which the terminal device is set as a destination; and
wherein the terminal device comprises:
a reception unit configured to receive, in a case where the terminal device turns into an online state after the plurality of pieces of notification information are sent by the management server while the terminal device is in an offline state, only part of the notification information among the plurality of pieces of the notification information sent by the management server while the terminal device is in the offline state; and
an execution unit configured to execute, in a case where the part of the notification information received by the terminal device includes at least the first information and second information for displaying a second content, predetermined control to execute displaying the first content based on the first information before displaying the second content based on the second information,
wherein the predetermined control causes the terminal device to display the first content and to display the second content after displaying the first content.

* * * * *